United States Patent Office 2,906,304
Patented Sept. 29, 1959

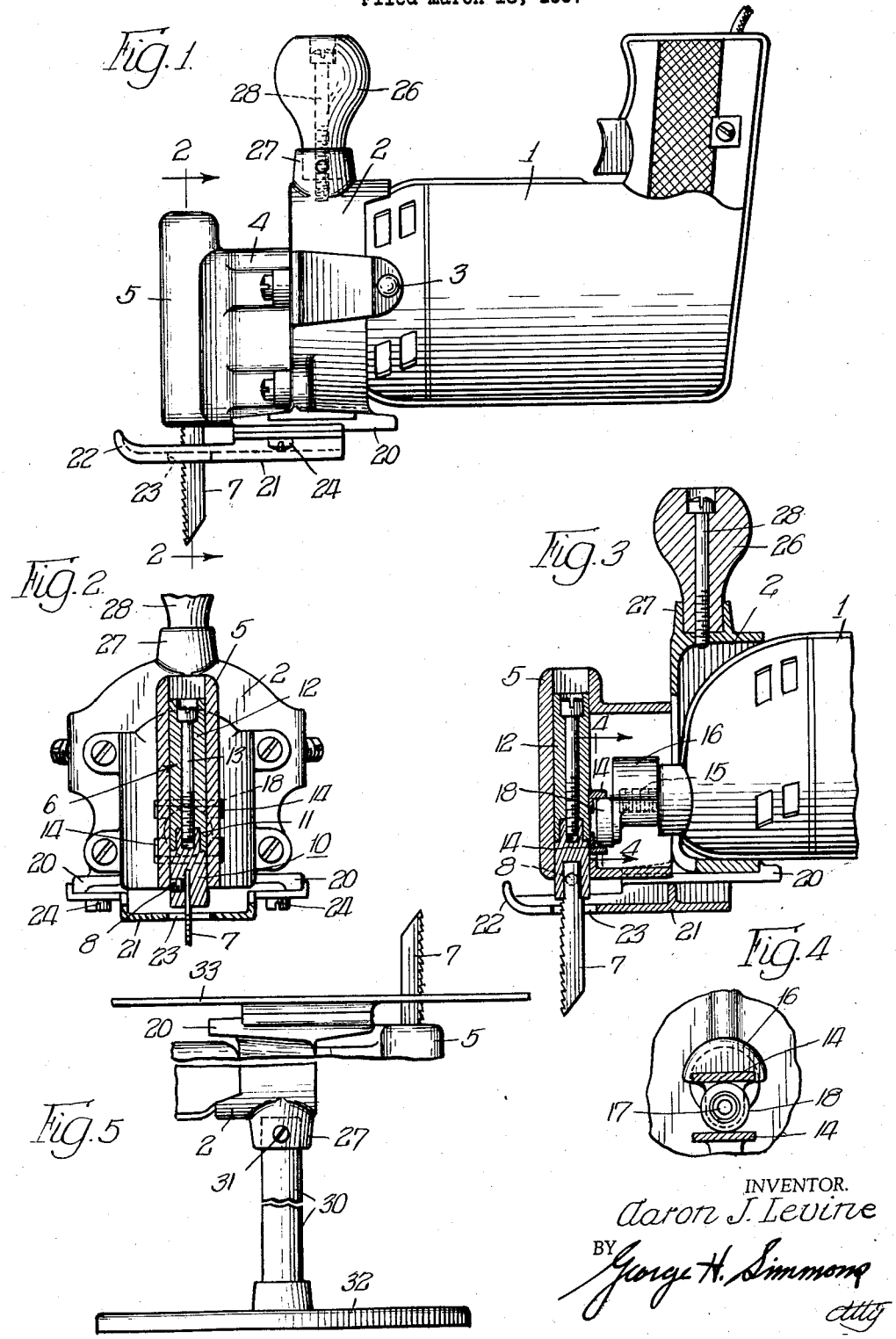

2,906,304
SABER SAW
Aaron J. Levine, Chicago, Ill.
Application March 18, 1957, Serial No. 646,767
4 Claims. (Cl. 143—68)

This invention relates to a saber saw attachment adapted to be mounted upon and driven by a portable electric drill, and has for its principal object the provision of a new and improved device of this kind.

It is a main object of the invention to provide a saber saw mechanism that is adapted to be mounted upon a tool supporting bracket that is fixed upon the casing of a portable electric drill, which mechanism is driven by the drill.

Another object of the invention is to provide a saber saw attachment for a portable electric drill which is capable of functioning properly even though the saw attachment is not properly aligned with respect to the axis of the drill shaft.

Another object of the invention is to provide a saber saw attachment for a portable electric drill in which the saw blade can be changed from one position to another without removing the attachment from the drill.

Another object of the invention is to provide a saber saw attachment which can be manufactured at low cost without sacrificing quality and which can be maintained in proper operating condition with little or no maintenance.

Further objects of the invention not specifically mentioned here will be apparent from the detailed description and claims which follow, reference being had to the accompanying drawings in which a preferred embodiment of the invention is shown by way of example and in which:

Fig. 1 is a side elevational view of the saber saw attached to a portable electric drill;

Fig. 2 is a fragmentary cross section taken substantially along the line 2—2 of Fig. 1, looking in the direction of the arrows;

Fig. 3 is a cross sectional view through the drill and attaching bracket, taken in a vertical plane through the axis of the drill shaft and showing the drill and the driving member thereon in elevation;

Fig. 4 is a fragmentary cross sectional view taken along the line 4—4 of Fig. 3, looking in the direction of the arrows; and Fig. 5 is a fragmentany view showing the saber saw mounted as a fixed rather than a portable tool.

Hobbyists and handymen are usually provided with portable electric drills and desire to have power tools driven by such drills. The present invention provides a saber saw attachment adapted to be mounted upon and driven by a portable electric drill, from the shaft of which the usual chuck has been removed. The present invention provides a bracket such as, for example, the bracket shown in my copending application, Serial No. 640,109, filed February 14, 1957, which is fixed upon and rigidly attached to the casing of a portable electric drill. The saber saw attachment mounts upon this bracket and contains a reciprocating shaft which is driven by a driving means fixed upon the drill shaft during operation of the device.

The invention will be best understood by reference to the accompanying drawings in which there is shown an electric drill 1, to the casing of which a bracket 2, preferably of the type shown in my copending application, is attached by convenient means such as screws 3.

Mounted upon the outer planar wall of the bracket is a housing 4 which contains a rectangular journal 5 in which is mounted a reciprocating shaft 6, to which shaft the saber saw blade 7 is attached in a convenient manner such as by a headless set screw 8.

The shaft 6 preferably consists of a driven portion comprising a block 10 of rectangular cross section composed of steel and having at its upper end a tenon 11 which, in the embodiment shown by way of example, is cylindrical in shape. The driven portion of the reciprocating shaft thus formed carries the saw blade 7. Shaft 6 also consists of a driving portion 12 which is also rectangular in section and has within it a socket into which the tenon 11 of the driven portion 10 projects. A screw 13 extending through a bore in the driving portion 12 of the shaft is threaded into the tenon 11 of the driven portion 10 to secure the shaft portions together as a unit.

The driving portion 12 of the reciprocating shaft carries spaced apart bosses 14 which project from the face of the shaft that is adjacent to the drill casing. These bosses 14 extend transversely of the axis of the reciprocating shaft 6 and the adjacent faces of the bosses 14 are planar and parallel to each other.

Threaded upon the shaft 15 of the drill is a driving member which comprises a counterweight 16 and a low friction bearing 17 that are offset with respect to the axis of the shaft. The outer rotatable section 18 of the bearing member 17 fits between and engages the adjacent planar faces of the projections 14 on the driving shaft portion 12. Through this arrangement, as the drill shaft rotates, the shaft 6 is reciprocated and the saw blade 7 driven thereby in a cutting operation.

Fixed upon the feet 20 of the bracket 2 is a base plate 21 which is bifurcated and upturned at its leading edges, as shown at 22. Formed in the base plate and in alignment with the reciprocating shaft 6 is a rectangular opening 23 through the center of which the saw blade 7 projects. The opening 23 is of such dimension as to permit the blade carrying driven portion 10 of the reciprocating shaft to pass through the base plate 21. The base plate 21 is attached to the feet 20 of the bracket 2 in convenient manner such as by screws 24.

In operation the base plate rests upon the work to be cut and since the teeth of the saw blade 7 point upwardly, the plate will be held firmly against the work during operation of the saw. The bracket 2 is provided with a handle 26 that projects into a socket 27 in the bracket and is held by a screw 28 threaded into the bracket.

In normal operation of the saw as a portable tool, the blade will be positioned in the position shown and the operator will guide it by engaging the handle 26 and the handle of the electric drill. The line to be followed in cutting will be clearly visible through the slot between the bifurcated ends 22 of the base plate, in which slot the saw blade 7 is centered. It may happen under special circumstances that it is advantageous to have the saw blade 7 pointing in another direction. To accomplish this, screw 13 is loosened by a screw driver projecting through the open upper end of the rectangular journal 5, thereby to free the saw carrying driven portion 10 of the reciprocating shaft 6 from the driving portion 12 thereof. The saw blade and shaft portion are then moved outwardly through the opening 23 in the base plate and turned through 90°, 180° or 270° clockwise or counterclockwise, and re-inserted into the journal bearing 5. Screw 13 is then registered with the threaded opening in 10 and 11 and tightened to re-assemble the driving shaft.

Although a device of this kind is ordinarily used as a portable tool, it may be advantageous at times to mount it as a stationary tool. Such an arrangement is shown in Fig. 5. To accomplish this, the handle 26 is removed from the bracket 2 and a post 30 inserted into the socket 27 in the bracket 2 and secured in a suitable manner as by a set screw 31. The post 30 is fixed in a base 32 which is secured upon a work bench. The base plate 21 is removed from the feet 20 of the bracket 2 and a larger planar plate 33 secured to the feet in lieu thereof. The plate 33, which is preferably about one foot square, contains a slot through which the blade 7 is projected. With this arrangement the saber saw attachment and drill remain stationary and the work is moved on the table 33 to feet it into the blade 7.

Preferably the driving portion 12 of the reciprocating shaft 6 and the housing 4 and rectangular journal 5 integral therewith, are cast from an alloy or metal that is self-lubricating, with the result that no lubrication of the reciprocating shaft is required.

As brought out more fully in my above mentioned copending application, the bracket 2 is adapted to be securely mounted upon and centered with respect to the axis of the drill shaft. When so mounted, this axis will coincide with the longitudinal median line of the reciprocating shaft 6 and saw blade 7; however, since tools of this type are adapted to be used by hobbyists and handymen, it cannot be guaranteed that the bracket 2 will always be mounted upon the drill casing in this proper manner, and therefore it must be assumed that at times the axis of the drill shaft will not coincide exactly with the longitudinal median line of the reciprocating shaft 6. Furthermore, due to slight misalignment of the bracket with respect to the drill casing, it may happen that the longitudinal median line of the reciprocating shaft will not always be at right angles to the axis of the drill shaft, as it is supposed to be. Notwithstanding these probable errors in alignment of the attachment with respect to the drill shaft, the device of the present invention will function properly.

In the embodiment shown by way of example, the low friction bearing member 17 is offset from the axis of the drill shaft by one-quarter of an inch, so that the maximum travel of the reciprocating shaft is one-half inch. The transversely extending bosses 14 on the second portion 12 of the shaft 6 in this embodiment are one inch in length, so that the point of engagement of the outer cone 18 of the bearing 17 and the bosses 14 is at all times well inwardly of the ends of the bosses 14. Thus, although the attachment be misaligned with respect to the axis of the drill shaft, it will nevertheless function properly. It will be noted in Fig. 3 particularly, that there is ample clearance between the adjacent faces of the bearing cone 18, and the portions of bosses 14 adjacent the shaft 6, thereby to permit proper function of the device even though the reciprocating shaft is not disposed truly to the right angles of the axis of the drill shaft.

Since the driving member carried on the drill shaft is counterbalanced by counterweight 16, the device functions smoothly and with a minimum vibration. In one instance, where the free running speed of the drill shaft is 2000 r.p.m., the saw blade is reciprocated at a speed approaching 2000 r.p.m., with little or no noticeable vibration.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described the preferred embodiment of my invention, what I consider new and desire to have protected by Letters Patent is pointed out in the appended claims.

What I claim is:

1. A saber saw adapted for attachment to the motor casing of a portable electric drill to be driven by said motor, comprising: a cuplike bracket having a flat end wall and side walls embracing the motor casing adjacent the shaft end thereof, said end wall containing a perforation through which the motor shaft projects; screws engaging the bracket and casing for fixing the bracket upon the casing; a housing detachably fixed upon the end wall of said bracket and having a cavity into which the motor shaft extends; a rectangular shaft journaled in said housing for reciprocation therein; spaced apart bosses carried upon said rectangular shaft; a driving member threaded upon the motor shaft and engaging said bosses to cause rotation of the motor shaft to reciprocate the rectangular shaft; a saw blade fixed to and carried by said rectangular shaft; and a base plate fixed upon the bracket for supporting the device upon the work and having a slot through which the saw blade projects.

2. A device as specified in claim 1, in which the reciprocating shaft comprises a blade carrying driven portion composed of steel and having a centrally located tenon projecting in a direction opposite the blade, a driving portion which carries said bosses and has a mortise into which the tenon projects, and a screw extending longitudinally through said driving portion and threaded into the driven portion for holding said shaft together as a unit.

3. A device as specified in claim 2, in which the driven portion of the reciprocating shaft may be registered with the driving portion thereof in any one of four positions and in which the slot in the base plate accommodates the saw blade in each of said four positions.

4. A device as specified in claim 2, in which the spaced apart bosses carried on the driving portion of the reciprocating shaft are on the face thereof adjacent the bracket and overhang the edges of that face equidistantly on both sides thereof, and in which one of said bosses also overhangs the end of that portion and the end of the driven portion registered therewith to aid in keeping the two portions of the shaft in alignment.

References Cited in the file of this patent

UNITED STATES PATENTS

| | | |
|---|---|---|
| 1,707,097 | Ruschke | Mar. 26, 1929 |
| 2,282,728 | Kern | May 12, 1942 |
| 2,737,984 | Bruck | Mar. 13, 1956 |
| 2,808,085 | Hollien et al. | Oct. 1, 1957 |